United States Patent
Huang et al.

(10) Patent No.: US 8,693,783 B2
(45) Date of Patent: Apr. 8, 2014

(54) PROCESSING METHOD FOR IMAGE INTERPOLATION

(75) Inventors: Yu-Chen Huang, Hsinchu County (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 190 days.

(21) Appl. No.: 13/307,002

(22) Filed: Nov. 30, 2011

(65) Prior Publication Data

US 2013/0084014 A1 Apr. 4, 2013

(30) Foreign Application Priority Data

Sep. 29, 2011 (TW) .............................. 100135302 A (51) Int. Cl.
*G06K 9/48* (2006.01)
*G06K 9/40* (2006.01)
*G06K 9/32* (2006.01)

(52) U.S. Cl.
USPC ............................ 382/199; 382/266; 382/300

(58) Field of Classification Search
None
See application file for complete search history.

(56) References Cited

U.S. PATENT DOCUMENTS

| | | | | | |
|---|---|---|---|---|---|
| 5,087,972 | A | * | 2/1992 | Sumi | 348/625 |
| 5,943,441 | A | * | 8/1999 | Michael | 382/199 |
| 5,987,172 | A | * | 11/1999 | Michael | 382/199 |
| 6,061,475 | A | * | 5/2000 | Blair | 382/239 |
| 6,157,749 | A | * | 12/2000 | Miyake | 382/300 |
| 6,650,704 | B1 | * | 11/2003 | Carlson et al. | 375/240.01 |
| 7,009,734 | B2 | * | 3/2006 | Suwa et al. | 358/1.9 |
| 7,522,314 | B2 | * | 4/2009 | Atkins | 358/3.27 |
| 8,014,689 | B2 | * | 9/2011 | Nishizawa | 399/49 |
| 2006/0039590 | A1 | * | 2/2006 | Lachine et al. | 382/128 |
| 2008/0002766 | A1 | * | 1/2008 | Suwa et al. | 375/240.12 |
| 2008/0002901 | A1 | * | 1/2008 | Miyagi et al. | 382/260 |
| 2008/0123151 | A1 | * | 5/2008 | Goto et al. | 358/3.27 |
| 2008/0231746 | A1 | * | 9/2008 | Lertrattanapanich et al. | 348/448 |
| 2008/0285990 | A1 | * | 11/2008 | Nishizawa | 399/49 |
| 2009/0202124 | A1 | * | 8/2009 | Matsuda et al. | 382/128 |
| 2010/0166334 | A1 | * | 7/2010 | Zhang et al. | 382/263 |
| 2010/0225646 | A1 | * | 9/2010 | Wei et al. | 345/419 |
| 2010/0302599 | A1 | * | 12/2010 | Goto et al. | 358/3.27 |
| 2011/0135201 | A1 | * | 6/2011 | Miyagi et al. | 382/167 |
| 2011/0170803 | A1 | * | 7/2011 | Yokoi | 382/300 |

OTHER PUBLICATIONS

Li, X. and Orchard, M.T., New Edge-Directed Interpolation, 2001, IEEE Transactions on Image Processing, vol. 10, No. 10, pp. 1521-1527.*

* cited by examiner

*Primary Examiner* — Stephen R Koziol
*Assistant Examiner* — Jonathan S Lee
(74) *Attorney, Agent, or Firm* — Jianq Chyun IP Office (57) ABSTRACT

A processing method for image interpolation is provided. In the method, a contour containing a destination pixel and a plurality of contour pixels is produced and detected by using an edge detection method for a selected area in an original image. Next, two extreme points are identified from the contour pixels by judging the changing trend of brightness value of the contour pixels on the contour. Then using the changing trend and two extreme points determines whether the destination pixel is located at a transition area or a non-transition area. If the destination pixel is located at the non-transition area, an interpolation adjust value is calculated according to the brightness values of the two extreme points and the brightness value of the destination pixel. An interpolation result of the destination pixel is obtained by performing the interpolation on the selected area according to the interpolation adjust value.

9 Claims, 5 Drawing Sheets

PROCESSING METHOD FOR IMAGE INTERPOLATION

CROSS-REFERENCE TO RELATED APPLICATION

This application claims the priority benefit of Taiwan application serial no. 100135302, filed on Sep. 29, 2011. The entirety of the above-mentioned patent application is hereby incorporated by reference herein and made a part of this specification.

BACKGROUND OF THE INVENTION

1. Field of the Invention

The invention relates generally to a processing method for image interpolation, and more particularly to a processing method for image interpolation having an edge enhancement effect.

2. Description of Related Art

Nowadays, image enlargement methods can be generally categorized into interpolation methods and super-resolution methods. Conventional interpolation methods include bilinear interpolation and bicubic interpolation, for example, and these interpolation methods are used for different kinds of image enlargement techniques. The computational complexity of the super-resolution methods is higher than the interpolation methods, since the super-resolution methods typically requires a large amount of training sample data to build the enlargement models and to serve as reference for predicting the enlargement of the original image. Therefore, the super-resolution methods require a longer computation period.

Bilinear interpolation methods have found widespread applications today. In a bilinear interpolation method, two neighboring pixels are interpolated in the horizontal and vertical directions in sequence. Although the bilinear interpolation method may be calculated quickly, the lack of high frequency image data results in image blurring after the image enlargement, and a block effect may also be generated.

Bicubic interpolation methods reference the brightness values of four pixels in the original image and multiply the weight values thereof in order to determine the brightness value of interpolation result. Compared to the bilinear interpolation methods, an image enlarged by the bicubic interpolation method has preferable edge sharpness, but as the degree of edge sharpness increases, an overshoot phenomenon at the image edge becomes significant. Moreover, as an enlargement factor is raised, the difference between an image enlarged by the bicubic interpolation method and an image enlarged optically becomes increasingly apparent.

SUMMARY OF THE INVENTION

Accordingly, the invention provides a processing method for image interpolation capable of selecting different interpolation processing methods according to different edge types, so as to enhance an image quality of the enlarged image at the edge area.

The invention provides a processing method for image interpolation including the following steps. Whether an edge exists for a selected area in an original image is detected by using an edge detection method, and an edge direction of the edge is determined. On a normal direction to the edge direction, a contour is produced by using a plurality of pixels in the original image to interpolate a plurality of contour pixels, in which a destination pixel is located on the contour. Two extreme points from the contour pixels are identified by judging a changing trend of a brightness value of the contour. Whether the destination pixel is located at a transition area or a non-transition area is determined. When the destination pixel is located at the non-transition area, an interpolation adjust value is calculated according to the brightness value of the two extreme points and the brightness value of the destination pixel. An interpolation result of the destination pixel is then obtained by performing the interpolation on the selected area according to the interpolation adjust value.

According to an embodiment of the invention, the step of judging the changing trend of the brightness value of the contour includes determining whether the changing trend of the brightness value of the contour is an increasing trend or a decreasing trend by using the plurality of contour pixels near the destination pixel on the contour.

According to an embodiment of the invention, the two extreme points include a maximum extreme point and a minimum extreme point. The maximum extreme point is the contour pixel on the contour having the highest brightness value on the increasing trend direction from location of the destination pixel. The minimum extreme point is the contour pixel on the contour having the lowest brightness value on the decreasing trend direction from location of the destination pixel.

According to an embodiment of the invention, determining whether the destination pixel is located at the transition area or the non-transition area includes the following steps. According to the brightness values of the two extreme points and the brightness value of the destination pixel, the brightness value of the destination pixel is determined to be near the brightness value of one extreme point of the two extreme points, and defining the closer extreme point as a destination extreme point. Whether an inflexion point exists among the contour pixels is determined from the location of the destination pixel toward an end of the destination extreme point. When the inflexion point exists among the contour pixels, the destination pixel is located at the non-transition area. When the inflexion point does not exist toward the end of the destination extreme point, the destination pixel is located at the transition area.

According to an embodiment of the invention, determining whether the inflexion point exists among the contour pixels from the location of the destination pixel toward the end of the destination extreme point includes the following steps. When the destination extreme point is located at the left side of the contour, if the changing trend of the brightness value of the contour pixels at the left side of the contour is opposite from the changing trend of the brightness value of the contour, or the changing trend of the brightness value of the plurality of pixels starting from the left side is lower than a threshold value, the inflexion point exists, and conversely the inflexion point does not exist. Moreover, when the destination extreme point is located at the right side of the contour, if the changing trend of the brightness value of the contour pixels at the right side of the contour is opposite from the changing trend of the brightness value of the contour, or the changing trend of the brightness value of the plurality of pixels starting from the right side is lower than a threshold value, the inflexion point exists, and conversely the inflexion point does not exist.

According to an embodiment of the invention, calculating the interpolation adjusts value according to the brightness values of the two extreme points and the brightness value of the destination pixel includes the following steps. A center point of the maximum extreme point and the minimum extreme point is calculated, and the brightness value of the center point is obtained by calculating an arithmetic average of the brightness value of the maximum extreme point and the brightness value of the minimum extreme point. Moreover, the interpolation adjust value is calculated by using the brightness value of the center point, the brightness value of the destination pixel, and the brightness value of the destination extreme point.

According to an embodiment of the invention, the step of obtaining the interpolation result of the destination pixel by performing the interpolation on the selected area according to the interpolation adjust value includes performing a bilateral interpolation on the selected area according to the interpolation adjust value to obtain the interpolation result of the destination pixel.

According to an embodiment of the invention, the processing method for image interpolation further includes when the destination pixel is located at the transition area, performing a bilinear interpolation on the selected area according to the interpolation adjust value to obtain an interpolation result of the destination pixel.

According to an embodiment of the invention, before the step of determining whether the destination pixel is located at the transition area or the non-transition area, the processing method for image interpolation further includes detecting the edge strength and the edge direction of all the pixels in the selected area by using the edge detection method, so as to judge an area type of the destination pixel. The area type includes an edge area, a smooth area, and a texture area.

According to an embodiment of the invention, in the processing method for image interpolation, when the area type of the destination pixel is the edge area, whether the destination pixel is located at the transition area or the non-transition area is subsequently determined. When the area type of the destination pixel is the smooth area, the bilinear interpolation is performed on the selected area. When the area type of the destination pixel is the texture area, the bicubic interpolation is performed on the selected area.

In summary, the invention provides a processing method for image interpolation which is not only capable of selecting different interpolation processing methods according to different edge types, so as to enhance an image quality of the enlarged image at the edge area, but the processing method for image interpolation can also differentiate whether the image has a smooth or texture area, and accordingly perform different types of interpolation process methods.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
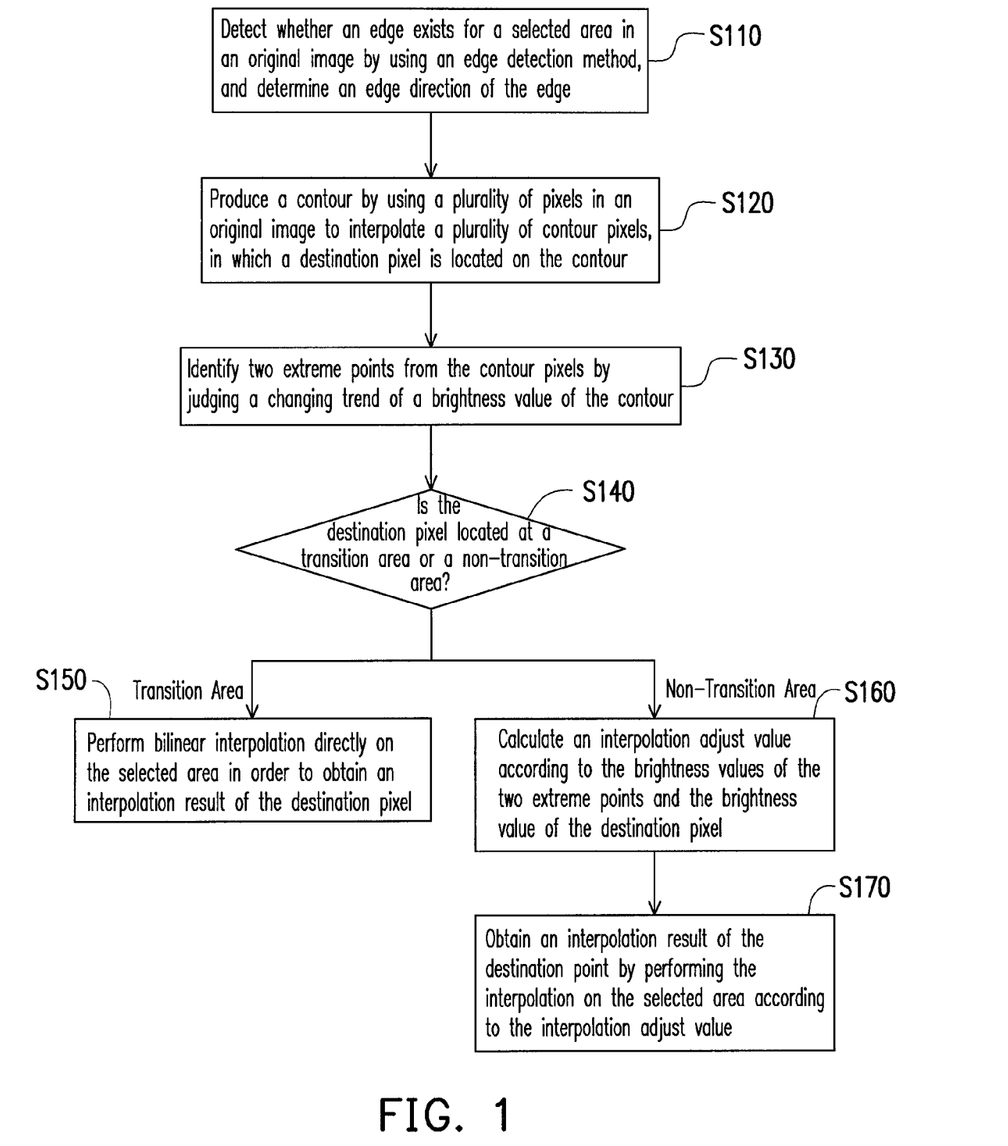
FIG. 1 is a flowchart illustrating a processing method for image interpolation according to an embodiment of the invention.
Figure 2:
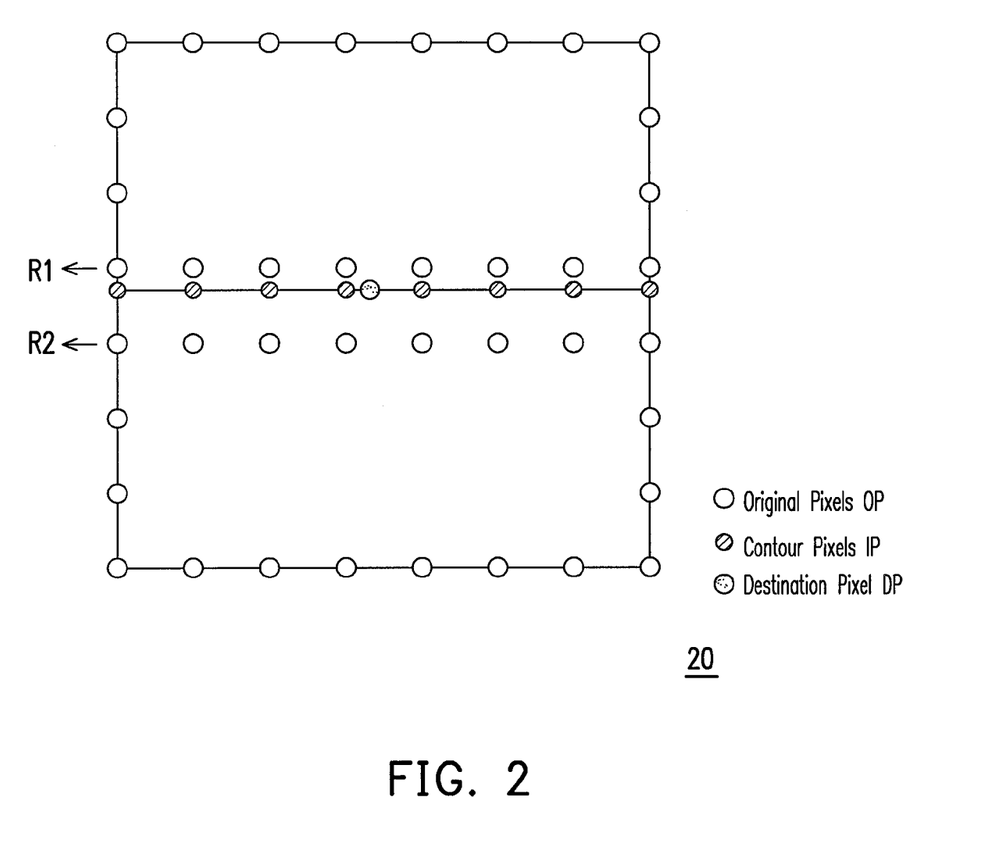
FIG. 2 illustrates a schematic view of a selected area and a plurality of contour pixels according to an embodiment of the invention.

FIG. 1 is a flowchart illustrating a processing method for image interpolation according to an embodiment of the invention. Referring to FIG. 1, as shown in a Step S110, whether an edge exists for a selected area in an original image is detected by using an edge detection method, and an edge direction of the edge is determined. FIG. 2 illustrates a schematic view of a selected area and a plurality of contour pixels according to an embodiment of the invention. The following description refers to FIGS. 1 and 2.

A selected area 20 is one area in an original image, and the selected area includes a plurality of original pixels OP. The original pixels OP are used to bilinearly interpolate a desination pixel, in which the destination pixel is located at a central position of the selected area 20. Thereafter, the edge detection method may be used to calculate edge strength of the selected area 20. The edge detection method includes using the Sobel operator, the Canny operator, or the Laplace operator, for example, to calculate the strength of the selected area 20 on four different directions (e.g., horizontal, vertical, and the two diagonal directions), so as to calculate the edge direction. In the present embodiment, as shown in FIG. 2, the edge direction is a vertical direction, and the normal direction to the edge direction is the horizontal direction.

Thereafter, as shown in a Step S120, on a normal direction to the edge direction, a contour is produced by using a plurality of original pixels to interpolate a plurality of contour pixels, in which a destination pixel is located on the contour. As shown in FIG. 2, the contour pixels IP can be interpolated by using two corresponding original pixels OP on a row R1 and a row R2. The contour pixels IP are located on a same horizontal direction to form the contour, and the contour and the destination pixel DP are located on a same line.

After finding the contour, a Step S130 is executed in which two extreme points from the contour pixels are identified by judging a changing trend of a brightness value of the contour. It should be noted that, when the original image is a grayscale image, the brightness value is a grayscale value of the pixel. When the original image is a color image, the brightness value may be a combination of R/G/B values of the pixel or a combination of the value/chroma of the pixel.

Figure 3:
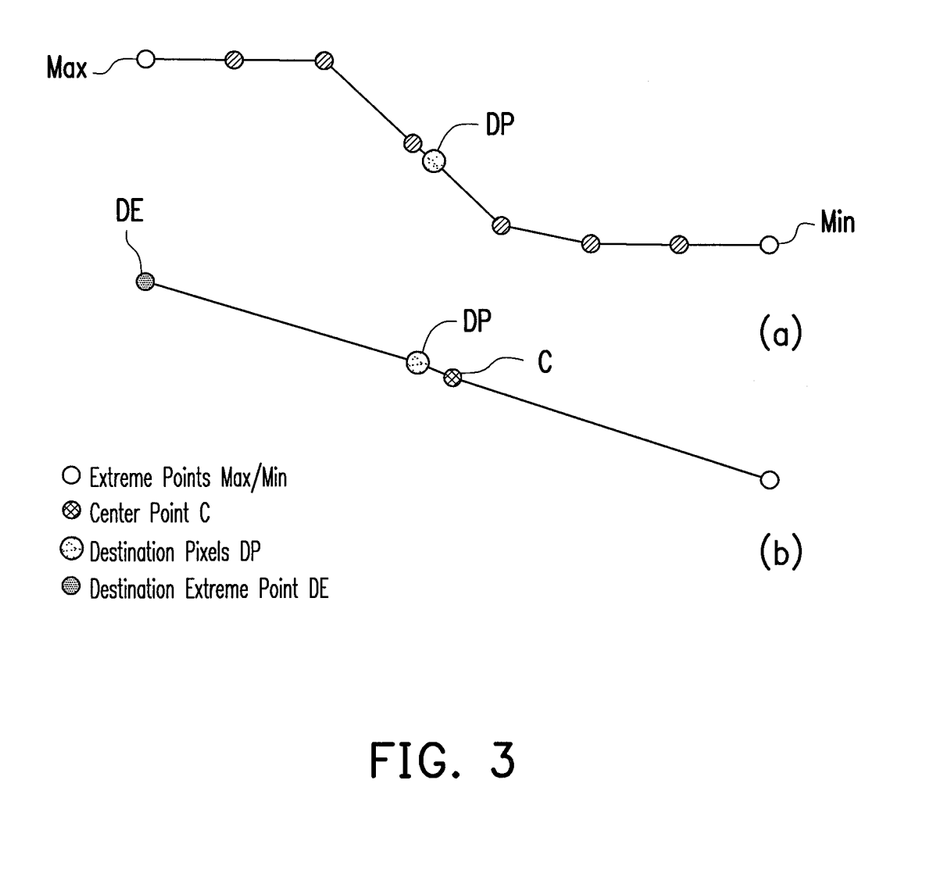
FIG. 3 is a schematic view illustrating a changing trend of a brightness value of a contour according to an embodiment of the invention, in which (a) illustrates the extreme points and (b) illustrates a center point and a destination extreme point.

FIG. 3 is a schematic view illustrating a changing trend of a brightness value of the contour according to an embodiment of the invention, in which (a) illustrates the extreme points and (b) illustrates a center point and a destination extreme point. Referring to FIGS. 1 and 3, whether the changing trend of the brightness value of the contour is increasing or decreasing is determined by using the plurality of contour pixels near the destination pixel on the contour. As shown in FIG. 3(a), the changing trend of the brightness value of the contour is a decreasing trend. Two extreme points from the contour pixels are then identified, in which the two extreme points include the maximum extreme point and the minimum extreme point. The maximum extreme point is the contour pixel on the contour having the highest brightness value on the increasing trend direction from location of the destination pixel. The minimum extreme point is the contour pixel on the contour having the lowest brightness value on the decreasing trend direction from location of the destination pixel. As shown in FIG. 3(a), the contour has a maximum extreme point Max and a minimum extreme point Min.

After obtaining the two extreme points, a Step S140 may be executed to determine whether the destination pixel is located at a transition area or a non-transition area. First, according to the brightness values of the two extreme points and the brightness value of the destination pixel, the brightness value of the destination pixel is judged to be near the brightness value of one extreme point of the two extreme points, and the closer extreme point is defined as the destination extreme point DE. Referring to FIG. 3(b), the brightness value of the center point of the maximum extreme point Max and the minimum extreme point Min may be calculated by taking an arithmetic average of the brightness value of the maximum extreme point Max and the brightness value of the minimum extreme point Min. When the brightness value of the destination pixel DP is higher than the brightness value of the center point C, the destination extreme point DE is the maximum extreme point Max. Conversely, the destination extreme point DE is the minimum extreme point Min. In the embodiment illustrated by FIG. 3(b), the destination extreme point DE is the maximum extreme point Max.

Figure 4:
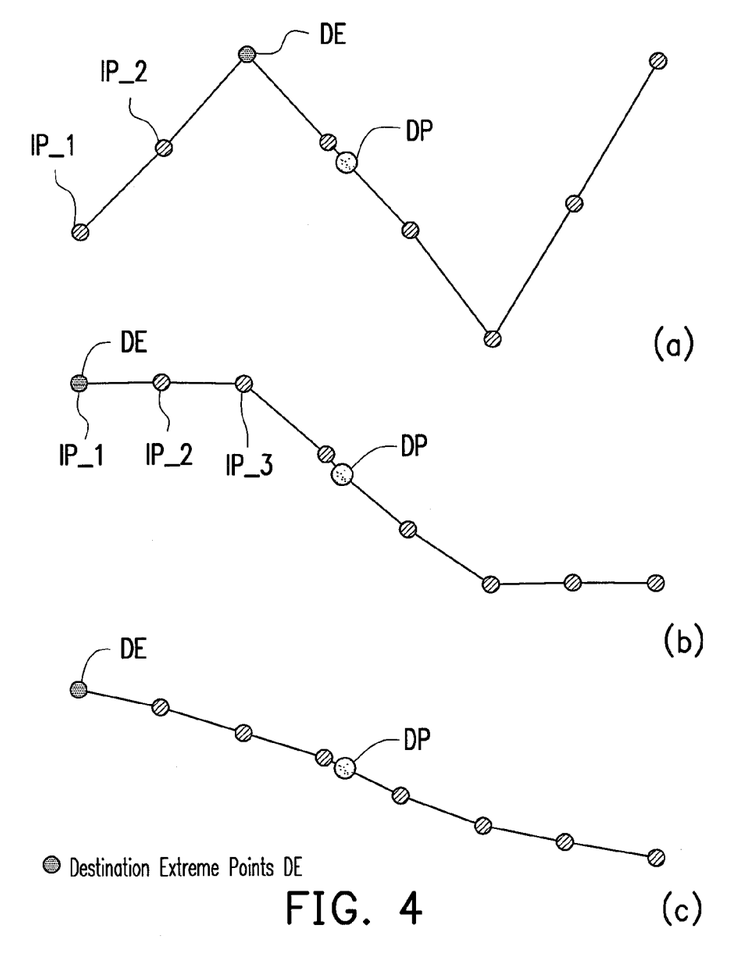
FIGS. 4(a)-4(c) illustrate three embodiments having contours with different end conditions.

Thereafter, whether an inflexion point exists among the contour pixels from the location of the destination pixel toward an end of the destination extreme point is determined. FIGS. 4(a)-4(c) illustrate three embodiments having contours with different end conditions. As shown in FIGS. 4(a)-4(c), in the contours formed by the contour pixels, the changing trends of the three contours are all decreasing from left to right. In the description hereafter, FIG. 4 is used as an example to illustrate how to determine whether an inflexion point exists in the contour.

Referring to FIG. 4(a), the destination extreme point DE is at the left side, and since the changing trend of the brightness value of the contour pixels IP_1 and IP_2 is increasing from left to right and opposite from the changing trend of the contour, therefore an inflexion point is determined.

Referring to FIG. 4(b), the destination extreme point DE is at the left side, and changing trend of the contour pixels at the left side is not opposite to the changing trend of the contour. The plurality of contour pixels starting from the left side enter a flat area, which means that the variation of the brightness values of the plurality of contour pixels starting from the left side is extremely small, and this condition indicates an inflexion point exists. In the present embodiment, assume the brightness value of the contour pixel IP_1 subtracted by the brightness value of the contour pixel IP_2 is a first decreasing difference value Diff_1, and the brightness value of the contour pixel IP_2 subtracted by the brightness value of the contour pixel IP_3 is a second decreasing difference value Diff_2. The first difference value Diff_1 and the second difference value Diff_2 are added together to obtain an end check value. When the end check value is lower than a trend threshold value, this represents the left side of the contour is a flat area or the contour is not decreasing from left to right. Therefore, an inflexion point is determined Moreover, the trend threshold value may be set by persons skilled in the art based on actual circumstances.

Referring to FIG. 4(c), the destination extreme point is at the left side, and the changing trend of the contour pixels at the left side is not opposite to the changing trend of the contour. In addition, the aforementioned end check value is higher than the trend threshold value. In other words, no inflexion point exists in the contour, and the destination pixel is determined to be located at the transition area.

Referring to FIG. 1, in the Step S140, whether the destination pixel is located at the transition area or the non-transition area is judged by determining whether an inflexion point exists in the contour. When the end with the destination extreme point does not have an inflexion point, the destination pixel is judged to be located at the transition area. Subsequently, a Step S150 is executed, in which bilinear interpolation is directly performed on the selected area in order to obtain an interpolation result of the destination pixel. When an inflexion point exists at the end with the destination extreme point, the destination pixel is judged to be located at the non-transition area. Subsequently, a Step S160 is executed.

Figure 5:
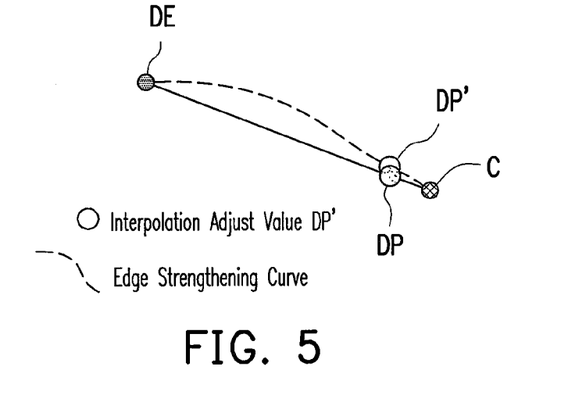
FIG. 5 illustrates a schematic view of a configuration of an interpolation adjust value using a destination extreme point and a center point.

In the Step S160, an interpolation adjust value is calculated according to the brightness values of the two extreme points and the brightness value of the destination pixel. Referring to FIG. 5, an interpolation adjust value DP' of the adjusted destination pixel is calculated by using the brightness value of the center point C, the brightness value of the destination pixel DP, and the brightness value of the destination extreme point, together with an edge strengthening curve configured in advance.

In a Step S170, an interpolation result of the destination pixel is then obtained by performing the interpolation on the selected area according to the interpolation adjust value. In the present embodiment, the interpolation result of the destination pixel may be obtained by performing a bilateral interpolation on the selected area according to the interpolation adjust value. In the bilateral interpolation, a first weight may be a distance to the destination pixel, and a second weight may be an brightness value difference with the interpolation adjust value.

The afore-described embodiments illustrate that the invention may be used to determine whether the destination pixel is located at the transition area or the non-transition area, and to accordingly perform the different suitable interpolation methods. However, the foregoing description illustrates the processing method when the selected area in the image is located at the edge area, which means the processing method is performed when a contour exists. When the selected area in the image belongs to another type of image, such as a smooth area or a texture area, an embodiment of the invention provides another processing method when the selected area does not have a contour.

Figure 6:
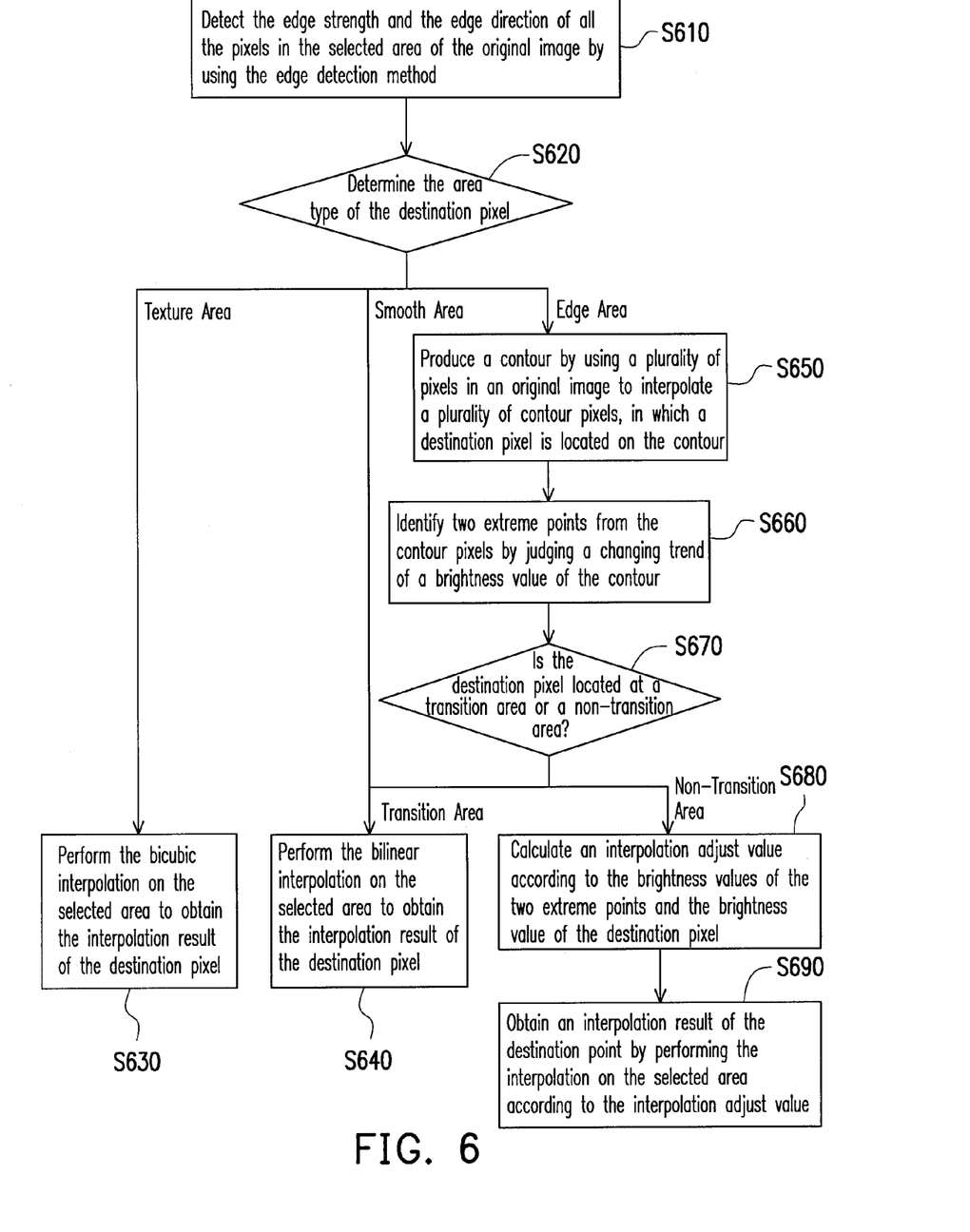
FIG. 6 is a flowchart illustrating a processing method for image interpolation according to another embodiment of the invention.

FIG. 6 is a flowchart illustrating a processing method for image interpolation according to another embodiment of the invention. Referring to FIG. 6, the processing method for image interpolation depicted in FIG. 6 is similar to the processing method for image interpolation depicted in FIG. 1, and therefore the differences therebetween are described hereafter.

Before the step of determining whether the destination pixel is located at the transition area or the non-transition area, the processing method further includes detecting the edge strength and the edge direction of all the pixels in the selected area by using the edge detection method, so as to judge an area type of the destination pixel. The area type includes an edge area, a smooth area, and a texture area. Only when the selected area the destination pixel is located in is the edge area can the edge pixels be used to interpolate a plurality of contour pixels to form the contour, and whether the destination pixel is located at the transition area or the non-transition area can be determined. When the selected area the destination pixel is located in is the smooth area or the texture area, the image characteristics thereof are different than the image characteristics of the edge area, and therefore a different type of interpolation is performed.

Accordingly, in a Step S610 of the present embodiment, after the edge strength and the edge direction of the selected area in the original image is detected by using the edge detection method, a Step S620 is subsequently executed to determine the area type of the selected area the destination pixel is located in. When the area type of the destination pixel is the texture area, a Step S630 is subsequently executed to perform the bicubic interpolation on the selected area. When the area type of the destination pixel is the smooth area, a Step S640 is subsequently executed to perform the bilinear interpolation on the selected area. When the area type of the destination pixel is the edge area, then the Steps S650-S690 are executed. Since the Steps S650-S690 are similar to the Steps 120-170 depicted in FIG. 1, further description thereof is omitted.

It should be noted that, the processing method for image interpolation according to embodiments of the invention is suitable for various types of image capturing device or image processing device. The image capturing device may be a digital camera, a video camera, or a mobile phone/a smartphone/a tablet computer with camera functions, for example, whereas the image processing device may be a computer or other processors having an image processing function. Therefore, the processing method for image interpolation in the invention may be implemented by software, hardware, or a combination of software and hardware, which is not limited by the invention.

In view of the foregoing, the processing methods for image interpolation provided by embodiments of the invention can perform different interpolation processing methods according to the area types in the image with different characteristics. In the smooth area of the image, the interpolation processing method maintaining a low noise effect can be used. In the texture area, the interpolation processing method capable of enhancing the sharpness degree and maintaining the natural details can be used. In the edge area, different interpolation processing methods can be used for different types of edges. When the edge is located at the non-transition area, the interpolation strengthening the edge is performed to enhance the sharpness degree of the image edge. When the edge is located at the transition area, the bilinear interpolation is directly performed. Accordingly, the processing methods for image interpolation provided by the invention do not produce the overshoot phenomenon at the image edge, so the image edge area can closely resemble the imaging effect of an actual optical enlargement.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A processing method for image interpolation, comprising:
    detecting whether an edge exists for a selected area in an original image by using an edge detection method, and determining an edge direction of the edge;
    on a normal direction to the edge direction, producing a contour by using a plurality of pixels in the original image to interpolate a plurality of contour pixels, wherein a destination pixel is located on the contour;
    identifying two extreme points from the contour pixels by judging a changing trend of a brightness value of the contour;
    determining whether the destination pixel is located at a transition area or a non-transition area;
    when the destination pixel is located at the non-transition area, calculating an interpolation adjust value according to the brightness values of the two extreme points and the brightness value of the destination pixel; and
    obtaining an interpolation result of the destination pixel by performing the interpolation on the selected area according to the interpolation adjust value,
    wherein the step of determining whether the destination pixel is located at the transition area or the non-transition area comprises:
        according to the brightness values of the two extreme points and the brightness value of the destination pixel, determining the brightness value of the destination pixel is near the brightness value of one extreme point of the two extreme points, and defining the closer extreme point as a destination extreme point;
        determining whether an inflexion point exists among the contour pixels from the location of the destination pixel toward an end of the destination extreme point;
        when the inflexion point exists among the contour pixels, the destination pixel is located at the non-transition area; and
        when the inflexion point does not exist among the contour pixels, the destination pixel is located at the transition area.

2. The processing method for image interpolation as claimed in claim 1, wherein the step of judging the changing trend of the brightness value of the contour comprises:
    determining whether the changing trend of the brightness value of the contour is an increasing trend or a decreasing trend by using the plurality of contour pixels near the destination pixel on the contour.

3. The processing method for image interpolation as claimed in claim 2, wherein:
    the two extreme points comprise a maximum extreme point and a minimum extreme point,
    wherein the maximum extreme point is the contour pixel on the contour having the highest brightness value on the increasing trend direction from location of the destination pixel, and the minimum extreme point is the contour pixel on the contour having the lowest brightness value on the decreasing trend direction from location of the destination pixel.

4. The processing method for image interpolation as claimed in claim 1, wherein the step of determining whether the inflexion point exists among the contour pixels from the location of the destination pixel toward the end of the destination extreme point comprises:
    when the destination extreme point is located at the left side of the contour, if the changing trend of the brightness value of the contour pixels at the left side of the contour is opposite from the changing trend of the brightness value of the contour, or the changing trend of the brightness value of the plurality of pixels starting from the left side is lower than a threshold value, the inflexion point exists, and conversely the inflexion point does not exist; and
    when the destination extreme point is located at the right side of the contour, if the changing trend of the brightness value of the contour pixels at the right side of the contour is opposite from the changing trend of the brightness value of the contour, or the changing trend of the brightness value of the plurality of pixels starting from the right side is lower than a threshold value, the inflexion point exists, and conversely the inflexion point does not exist.

5. The processing method for image interpolation as claimed in claim 1, wherein the step of calculating the interpolation adjust value according to the brightness values of the two extreme points and the brightness value of the destination pixel comprises:
   calculating a center point of the maximum extreme point and the minimum extreme point, and obtaining the brightness value of the center point by calculating an arithmetic average of the brightness value of the maximum extreme point and the brightness value of the minimum extreme point;
   when the brightness value of the destination pixel is higher than the brightness value of the center point, the destination extreme point is the maximum extreme point, and conversely, the destination extreme point is the minimum extreme point; and
   calculating the interpolation adjust value by using the brightness value of the center point, the brightness value of the destination pixel, and the brightness value of the destination extreme point.

6. The processing method for image interpolation as claimed in claim 1, wherein the step of obtaining the interpolation result of the destination pixel by performing the interpolation on the selected area according to the interpolation adjust value comprises:
   performing a bilateral interpolation on the selected area according to the interpolation adjust value to obtain the interpolation result of the destination pixel.

7. The processing method for image interpolation as claimed in claim 1, further comprising:
   when the destination pixel is located at the transition area, performing a bilinear interpolation on the selected area to obtain an interpolation result of the destination pixel.

8. The processing method for image interpolation as claimed in claim 1, wherein before the step of determining whether the destination pixel is located at the transition area or the non-transition area, the processing method further comprises:
   detecting the edge strength and the edge direction of all the pixels in the selected area by using the edge detection method, so as to judge an area type of the destination pixel, wherein the area type comprises an edge area, a smooth area, and a texture area.

9. The processing method for image interpolation as claimed in claim 8, wherein:
   when the area type of the destination pixel is the edge area, subsequently determining whether the destination pixel is located at the transition area or the non-transition area,
   when the area type of the destination pixel is the smooth area, performing the bilinear interpolation on the selected area,
   and when the area type of the destination pixel is the texture area, performing the bicubic interpolation on the selected area.

* * * * *